(No Model.) 3 Sheets—Sheet 2.

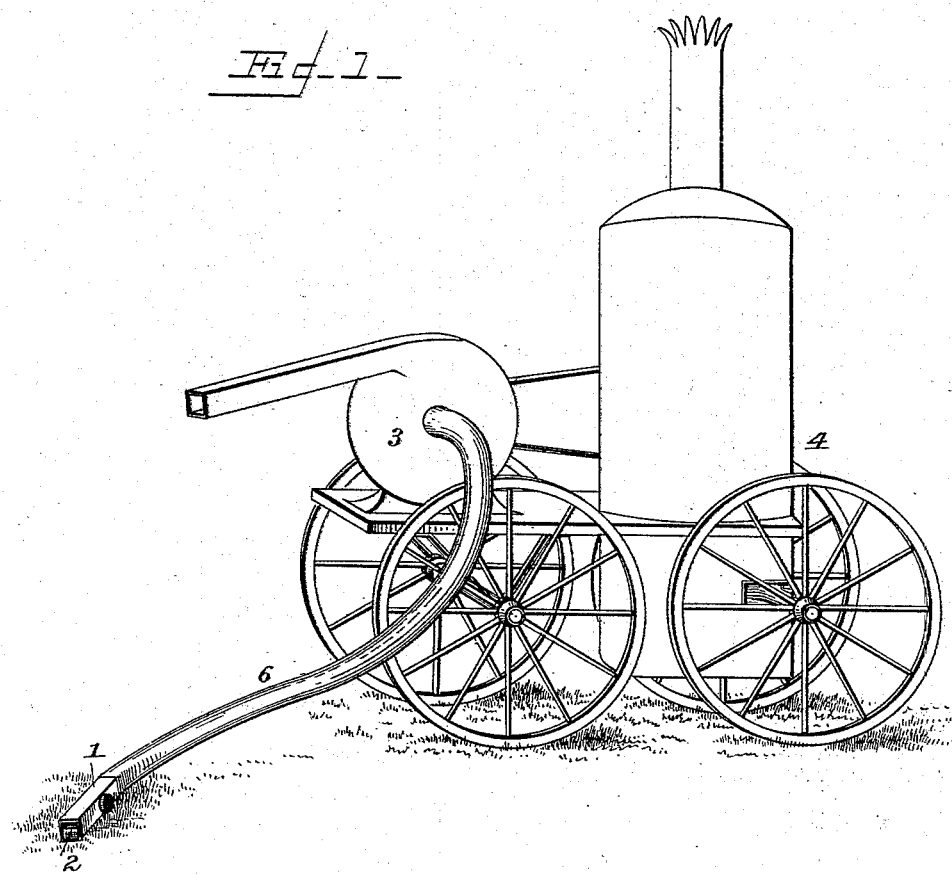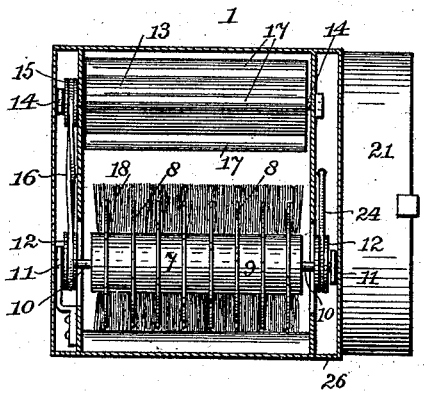

J. NEIGHBORS.
COTTON PICKER.

No. 535,769. Patented Mar. 12, 1895.

Witnesses
Chas. N. Ourand

Inventor
James Neighbors
By his Attorneys.
C. A. Snow & Co.

(No Model.)  3 Sheets—Sheet 3.

J. NEIGHBORS.
COTTON PICKER.

No. 535,769.  Patented Mar. 12, 1895.

Witnesses
Chas. H. Ourand

Inventor
James Neighbors
By his Attorneys,
C. A. Snow & Co.

UNITED STATES PATENT OFFICE.

JAMES NEIGHBORS, OF FORT SMITH, ARKANSAS, ASSIGNOR OF THREE-FOURTHS TO FRANK D. NICHOLS, JOHN MATHEWS, AND GEORGE SINGLE, OF SAME PLACE.

COTTON-PICKER.

SPECIFICATION forming part of Letters Patent No. 535,769, dated March 12, 1895.

Application filed April 23, 1894. Serial No. 508,696. (No model.)

*To all whom it may concern:*

Be it known that I, JAMES NEIGHBORS, a citizen of the United States, residing at Fort Smith, in the county of Sebastian and State of Arkansas, have invented a new and useful Cotton-Picker, of which the following is a specification.

My invention relates to a cotton picking apparatus, and has for its object to pick cotton from the stock or stalk by suction produced by a suction fan or blower; to provide means whereby cotton separating devices are arranged in position to intercept the cotton as it enters the apparatus; and to provide means for driving the separating devices by means of a drive fan operated by a current of air produced by the suction fan or blower.

Further objects and advantages of the invention will appear in the following description, and the novel features thereof will be particularly pointed out in the claim.

Figure 2:
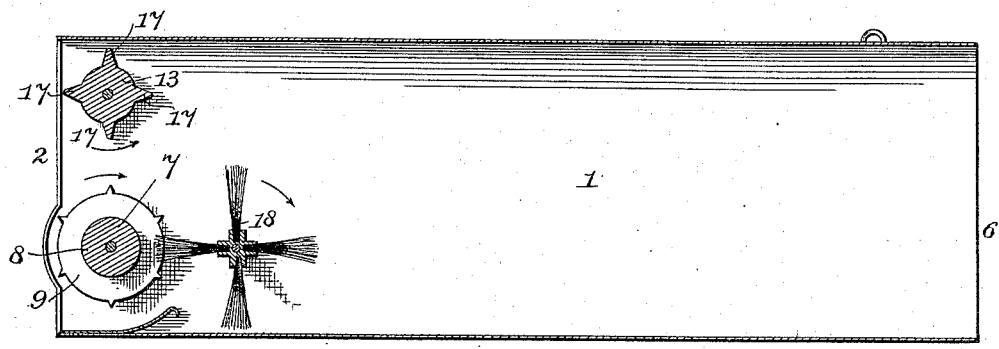
Figure 3:
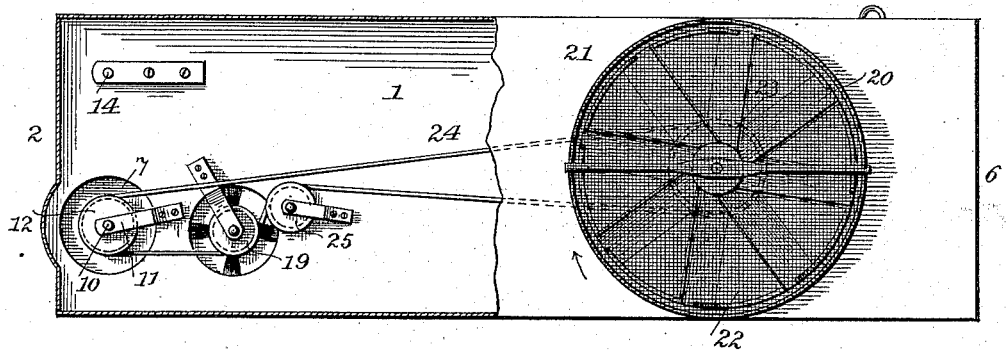
Figure 4:
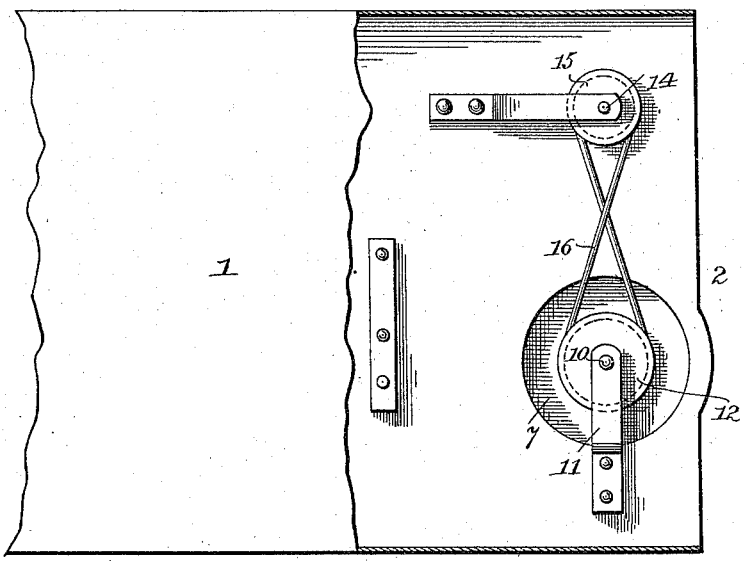
Figure 5:
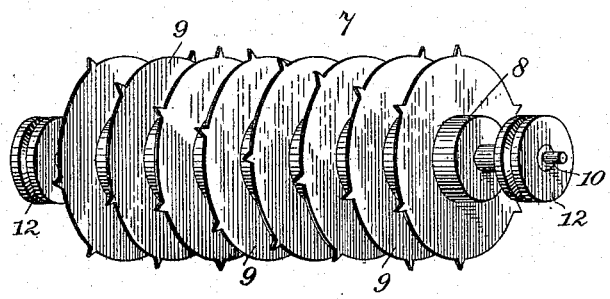

In the drawings:—Figure 1 is a perspective view of an apparatus embodying my invention. Fig. 2 is a longitudinal section of the portable box or nozzle. Fig. 3 is a side view of the same partly broken away to show the mechanism for communicating motion from the drive fan to the separating devices. Fig. 4 is a partial side view of the box or nozzle taken from the opposite side to show the means for communicating motion from the separating cylinder to the feeder. Fig. 5 is a detail view of the separating cylinder.

Similar numerals of reference indicate corresponding parts in all the figures of the drawings.

1 designates a portable box or nozzle, which is adapted to be carried by the operator and presented successively to the cotton plants with its open inlet end 2 in proximity to the cotton in order that the cotton may be removed from the plant and drawn into the box or nozzle by means of suction produced by a suction fan or blower 3, which is preferably located upon and carried by a truck 4. This suction fan or blower may be of any ordinary or preferred construction, and its inlet is connected with the rear end of the box or nozzle by means of a flexible hose or tube 6, the power to drive said suction fan or blower being supplied by a gas, gasoline, steam, or other engine located upon the truck, but which is not shown in the drawings for the reason that its specific construction forms no part of my invention.

At the front or inlet end of the suction box or nozzle is arranged a rotatable separating cylinder 7, the construction of which may be varied as experience may dictate, but which in the drawings accompanying this specification, consists of a core 8 provided with a series of juxtaposed spaced toothed disks or saws 9. The core of the cylinder is extended laterally beyond the planes of the sides of the box or nozzle and reduced to form spindles or trunnions 10 which are mounted in bearings formed in the brackets 11, and fixed to these spindles or trunnions are belt pulleys 12, which in the construction illustrated are peripherally grooved to receive a round belt or cord.

Located above and with its axis parallel with that of the cylinder is a feeding roll 13, the trunnions 14 of which are mounted in bearings in the box or nozzle, one of said trunnions being extended beyond the plane of the side of the same to carry a fixed belt pulley 15 which is connected with the belt-pulley on the corresponding end of the cylinder by means of a crossed endless belt 16. By these means the rotation of the cylinder is communicated to the feeding roll and the latter is caused to rotate in an opposite direction to the cylinder, whereby their adjacent sides move in the same direction. This feeding roll is fluted or provided with a series of spaced radial longitudinally disposed wings or webs 17.

Located in rear of the separating cylinder with its axis approximately in the plane of that of said cylinder is a cleaning or removing brush 18, the front side of which is adapted to contact with the rear side of the cylinder in order to remove from the teeth of the latter any cotton which may adhere thereto. This brush should rotate in the same direction as the cylinder in order that its front side may move in the opposite direction to the rear side of the cylinder, all as indicated by the arrows in Fig. 2. The spindle of the brush is provided beyond the side of the box or nozzle with a belt pulley 19.

The power for driving the above described separating devices is derived from a drive fan 20, mounted in an offset portion 21 near the rear end of the box or nozzle, said offset portion or casing being covered at its outer side with a perforated or wire gauze guard 22. The wings of the drive fan are deflected in such a way that the current of air induced in the box or nozzle by means of the suction or operating fan causes a rotation thereof in the direction indicated by the arrow in Fig. 3, and a pulley 23 on the shaft of the drive fan is connected by means of an endless belt 24 with the pulleys on the spindles of the separating cylinder and the brush, an idle pulley 25 being interposed in rear of the pulley on the brush spindle to insure a positive pressure of the belt upon the pulley of the latter spindle. The pulleys and the belt for communicating motion from the drive fan to the separating devices are preferably protected by means of a false side or cover 26, which is shown removed in Fig. 3, in order to prevent contact therewith of the hands or clothing of the operator, and at the same time, prevent the cotton from becoming entangled therewith.

This being the construction of the improved apparatus the operation thereof, briefly stated, is as follows:—The inlet or front end of the box or nozzle is presented to the cotton plant and the suction produced therein by the suction fan or blower separates the cotton from the plant and draws it into contact with the separating cylinder, the fluted or winged feeder which rotates in a direction opposite to that of said cylinder serving as a means of forcing the cotton into contact with the cylinder. The brush which rotates in the rear of the cylinder removes the cotton from the teeth of the latter and liberates it within the box or nozzle, whereby it is carried backward and through the flexible hose or tubing and through the fan or blower to a receptacle (not shown) which is located at the outlet opening in said fan.

From the above description it will be seen that the operator is enabled to carry the box or nozzle and present it successively to different cotton plants in position to remove the cotton therefrom and in order to facilitate this operation the box or nozzle is made of simple construction, and materials of light weight are employed, sheet metal being preferable. The flexible hose or tubing gives freedom of movement to the box or nozzle and the heavy portion of the apparatus consisting of the suction fan or blower and the engine or other mechanism for driving the same is carried by a truck which may be drawn or pushed through the field in rear of the operator.

From the above description, it will be seen, that the peculiar arrangement of the drive-fan in an offset of the casing leaves the passage through the casing entirely unobstructed, and also that all of the air which enters the casing through the opening in which the drive-fan is located, acts upon, and serves to impart motion to, the fan. All of the wings of the fan are exposed permanently to the current of air induced by the fan or blower, and hence sufficient power is derived from the drive-fan to operate the picking devices, by the use of a blower capable of inducing a blast of moderate force.

It will be understood that in practice various changes in the form, proportion, and the minor details of construction may be resorted to without departing from the spirit of the invention or sacrificing any of the advantages thereof.

Having described my invention, what I claim is—

In a device of the class described, the combination with a flexible hose, and a suction fan in communication therewith, of a nozzle communicating with said hose and having a casing provided with a lateral offset communicating with the interior of the casing, a drive-fan located in said offset with its axis arranged perpendicular to the plane of the contiguous side of the casing, whereby all of the wings of the fan are exposed to a current of air entering the casing through the offset, picking devices arranged at the front end of the casing, and connections between said picking devices and the drive-fan, substantially as described.

In testimony that I claim the foregoing as my own I have hereto affixed my signature in the presence of two witnesses.

JAMES NEIGHBORS.

Witnesses:
J. S. MILLER,
J. H. MATTHEWS.